US011117722B1

(12) United States Patent
Warner et al.

(10) Patent No.: US 11,117,722 B1
(45) Date of Patent: Sep. 14, 2021

(54) SAFETY CONTAINER

(71) Applicant: Assurpack LLC, Greenwood Village, CO (US)

(72) Inventors: Nancy Warner, Greenwood Village, CO (US); Jeremiah Buck, Wheat Ridge, CO (US)

(73) Assignee: Assurpack LLC, Greenwood Village, CO (US)

( * ) Notice: Subject to any disclaimer, the term of this patent is extended or adjusted under 35 U.S.C. 154(b) by 0 days.

(21) Appl. No.: 17/237,126

(22) Filed: Apr. 22, 2021

(51) Int. Cl.
*B65D 50/04* (2006.01)
*B65D 43/22* (2006.01)
*B65D 43/16* (2006.01)

(52) U.S. Cl.
CPC ......... *B65D 50/045* (2013.01); *B65D 43/162* (2013.01); *B65D 43/22* (2013.01)

(58) Field of Classification Search
CPC ............................ B65D 50/045; B65D 43/162
USPC .......................................................... 206/1.5
See application file for complete search history.

(56) References Cited

U.S. PATENT DOCUMENTS

| | | | |
|---|---|---|---|
| 4,146,146 A | 3/1979 | Mar | |
| 4,203,532 A | 5/1980 | Mar | |
| 4,512,484 A | 4/1985 | Mar | |
| 5,887,736 A * | 3/1999 | Mar | B65D 50/045 215/213 |
| 6,367,639 B1 * | 4/2002 | Mar | B65D 50/066 215/211 |
| 7,370,773 B2 * | 5/2008 | Toth | B65D 50/04 220/348 |
| 8,657,136 B2 * | 2/2014 | Adler | B65D 43/20 215/201 |
| 9,120,605 B1 * | 9/2015 | Mar | B65D 50/06 |
| 9,266,649 B1 | 2/2016 | Mar | |
| 10,722,427 B2 * | 7/2020 | Cantor | G16H 40/63 |
| 2011/0127269 A1 * | 6/2011 | Bucholtz | B65D 43/162 220/378 |
| 2015/0307259 A1 * | 10/2015 | Giraud | B65D 50/045 221/193 |
| 2015/0366755 A1 * | 12/2015 | Milante | B65D 43/0218 215/203 |
| 2018/0093805 A1 * | 4/2018 | Tiesberger | B65D 50/045 |

* cited by examiner

*Primary Examiner* — Robert J Hicks
*Assistant Examiner* — Tia Cox
(74) *Attorney, Agent, or Firm* — John H. Choi & Associates

(57) ABSTRACT

A safety container having a container section with a container body and a lip portion above an inner surface of a passage in the body. A cover section conforms to at least a part of the lip portion and is coupled thereto. A sealing member is coupled to a bottom portion of the cover section. A locking pin is slidably mounted to the bottom portion of the cover section and engageable with the container section. In a locked position, the container section and the cover section are locked by the locking pin outer end engaging the lip portion outer end, and the sealing member engaging the container body inner surface, to seal the passage of the container body. In an open position, the locking pin and the lip portion are disengaged, and the locking pin is engaged upward to at least partially remove the cover section from the container section.

20 Claims, 15 Drawing Sheets

SAFETY CONTAINER

FIELD

The present disclosure relates to containers and in particular to a safety container being child-resistant and moisture-resistant.

BACKGROUND

Child-resistant containers allow adult users to store materials which would be unsafe for consumption or use by children, by requiring manipulation of a cap or lid of the container with sufficient force to open the container and which a child cannot attain. In other words, child-resistant containers are necessary to store goods or materials that might be harmful to children.

Moisture-resistant containers allow for materials stored therein to maintain its quality for an extended period of time and prevent premature degradation or decay. Moisture-resistant containers are particularly advantageous for sellers of goods or materials that would otherwise decay because shelf life is extended thereby giving the sellers an opportunity to sell the product for a longer period of time. However, most moisture-resistant product packaging are not reusable and even if resealable, the level of moisture-resistance is substantially less when resealed.

While child-resistant container are typically small and used to store medicine and the like, moisture-resistant containers are typically larger and used to store foodstuffs. Even though child-resistant containers and moisture-resistant containers exist, very few, if any, containers with both qualities exist. Furthermore, very few, if any, containers of such exist that are reusable while maintaining the original moisture-resistance.

Reusable small containers that are both child-resistant and moisture-resistant are ideal for certain materials such as spices, herbal medicine and other dry goods that are not normally sold in bulk. A need exists, therefore, for a safety container that is child-resistant and moisture-resistant that is convenient for the user and useful for sellers of products contained therein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect, the present invention provides a safety container, comprising, in combination: a container section having a container body and a lip portion surrounding a passage in the body, the passage in the container body defined by an inner surface, the lip portion having an inner end and an opposing outer end, the lip portion outer end comprising a lower locking member; a cover section conforming to at least a part of the lip portion, the cover section having an inner end and an opposing outer end, the cover section inner end hingedly coupled with the lip portion inner end, the cover section comprising: a pin channel formed on a bottom surface of the cover section, the pin channel extending along the cover section inner and outer ends, and an upper coupling member extending downwardly from the bottom surface; a sealing member, the sealing member having a lower coupling member extending upwardly therefrom and conforming to the upper coupling member and secured thereto, and an outer edge conforming to the inner surface of the container body; and a locking pin slidably mounted in the pin channel, the locking pin having an inner end and an opposing outer end, the locking pin comprising: an engagement member on the locking pin inner end, an upper locking member on the locking pin outer end conforming to the lower locking member, and a biasing member coupled therebetween; wherein in a locked position, the upper and lower locking members lockingly engage each other and the sealing member outer edge engages the container body inner surface to seal the passage of the container body; and wherein the locking pin engagement member is depressed toward the cover section outer end thereby releasing the upper and lower locking members, and the upper locking member is engaged upwardly to at least partially remove the cover section from the container section to an open position.

In another aspect, the present invention provides a safety container, comprising, in combination: a container section having a container body and a lip portion surrounding a passage in the body, the passage in the container body defined by an inner surface, the lip portion having an inner end and an opposing outer end, the lip portion outer end comprising a lower locking member; a cover section conforming to at least a part of the lip portion, the cover section having an inner end and an opposing outer end, the cover section at least partially removably coupled with the lip portion, the cover section comprising: a pin channel formed on a bottom surface of the cover section, the pin channel extending along the cover section inner and outer ends, and an upper coupling member extending downwardly from the bottom surface; a sealing member, the sealing member having a lower coupling member extending upwardly therefrom and conforming to the upper coupling member and secured thereto, and an outer edge conforming to the inner surface of the container body; and a locking pin slidably mounted in the pin channel, the locking pin having an inner end and an opposing outer end, the locking pin comprising an upper locking member on the locking pin outer end conforming to the lower locking member; wherein in a locked position, the upper and lower locking members lockingly engage each other and the sealing member outer edge engages the body inner surface to seal the passage of the container body; and wherein the upper and lower locking members are disengaged, and the upper locking member is engaged upwardly to at least partially remove the cover section from the container section to an open position.

In yet another aspect, the present invention provides a safety container, comprising, in combination: a container section having a container body and a lip portion surrounding a passage in the body, the passage in the container body defined by an inner surface, the lip portion having an inner end and an opposing outer end; a cover section conforming to at least a part of the lip portion and at least partially removably coupled thereto, the cover section having an inner end and an opposing outer end; a sealing member coupled to a bottom portion of the cover section; and a locking pin slidably mounted to the bottom portion of the cover section and engageable with the container section, the locking pin having an inner end and an outer end; wherein in a locked position, the container section and the cover section lockingly engage each other by the locking pin outer end engaging the lip portion outer end, and the sealing member engaging the container body inner surface to seal the passage of the container body; and wherein in an open position, the locking pin is disengaged from the lip portion and the locking pin is further engaged upward to at least partially remove the cover section from the container section.

The safety containers of the present invention, described below, were tested and fulfilled the standards under 16 CFR § 1700.20 for child-resistant effectiveness, senior adult use effectiveness and other code requirements. Specifically, the safety containers 1, 100 described below were up to 96% effective for child-resistance, 100% effective for senior adult users and met the Consumer Product Safety Commission's protocol and standards for Poison Prevention Packaging.

The safety containers 1, 100 described below met USP 42/NF 37 Supplement 2 requirements and were also tested for moisture-resistance (USP 671) and were deemed to be "tight containers" under the standard. Specifically, the safety container 1 of the first embodiment was deemed to be a "tight container" as tests showed that moisture vapor transmission did not exceed 72 mg/day/L, significantly below the 100 mg/day/L threshold. Similarly, the safety container 100 of the second embodiment was deemed to be a "tight container" as tests showed that moisture vapor transmission did not exceed 36 mg/day/L, well below the standard of 100 mg/day/L. As such, tests showed that dry goods stored in the safety containers 1, 100 of the present invention could achieve up to a 10-month shelf life.

BRIEF DESCRIPTION OF DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

Figure 1:
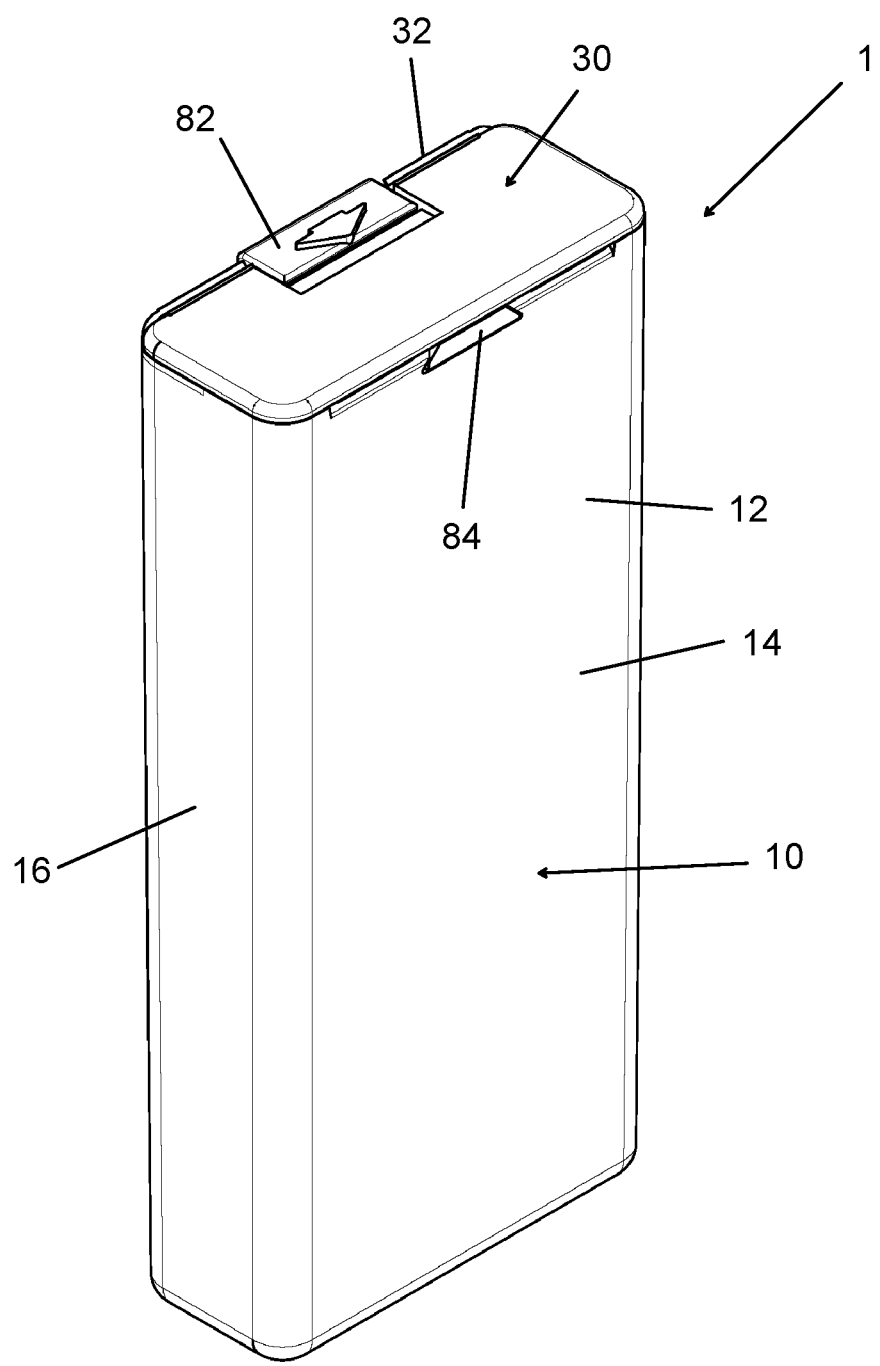
FIG. 1 is a top front side perspective view of an embodiment of the safety container of the present invention in a locked position.

To facilitate an understanding of the invention, identical reference numerals have been used, when appropriate, to designate the same or similar elements that are common to the figures. Further, unless stated otherwise, the features shown in the figures are not drawn to scale but are shown for illustrative purposes only.

DETAILED DESCRIPTION

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left may be used to describe the accompanying figures. The terminology includes the words above specifically mentioned, derivatives thereof, and words of similar import.

Figure 2:
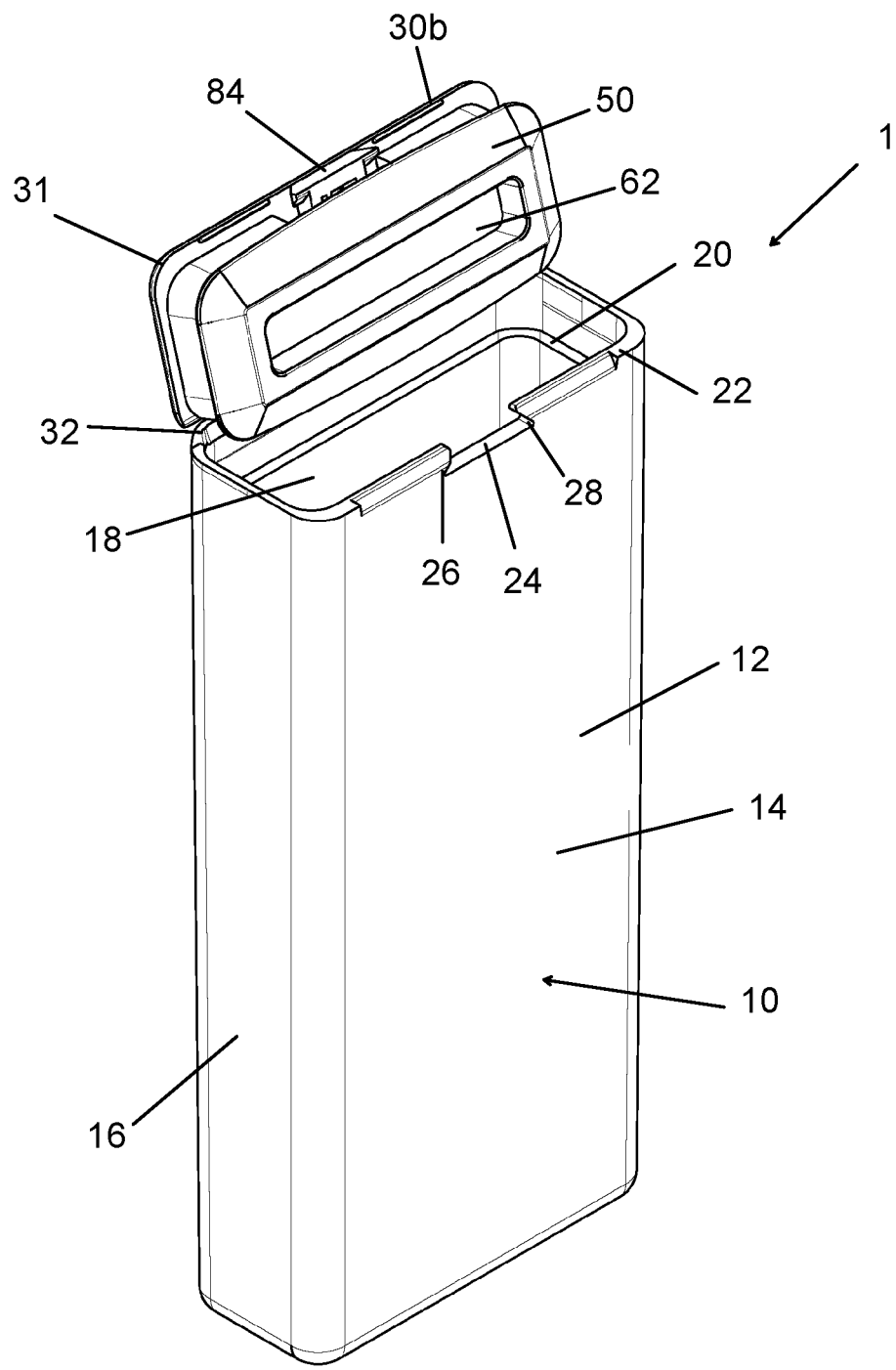
FIG. 2 is a top front side perspective view of the safety container of FIG. 1 in an open position.

FIGS. 1 and 2 show an embodiment of a safety container 1 of the present invention. In general, the safety container 1 includes a container section 10 coupled with a cover section 30 hingedly or rotatably coupled thereto for safely opening and closing the cover section 30 to remove materials from or insert materials into the safety container 1 while meeting child-resistance certification requirements. Moreover, the safety container 1 is constructed to meet certification requirements for moisture resistance.

Figure 3:
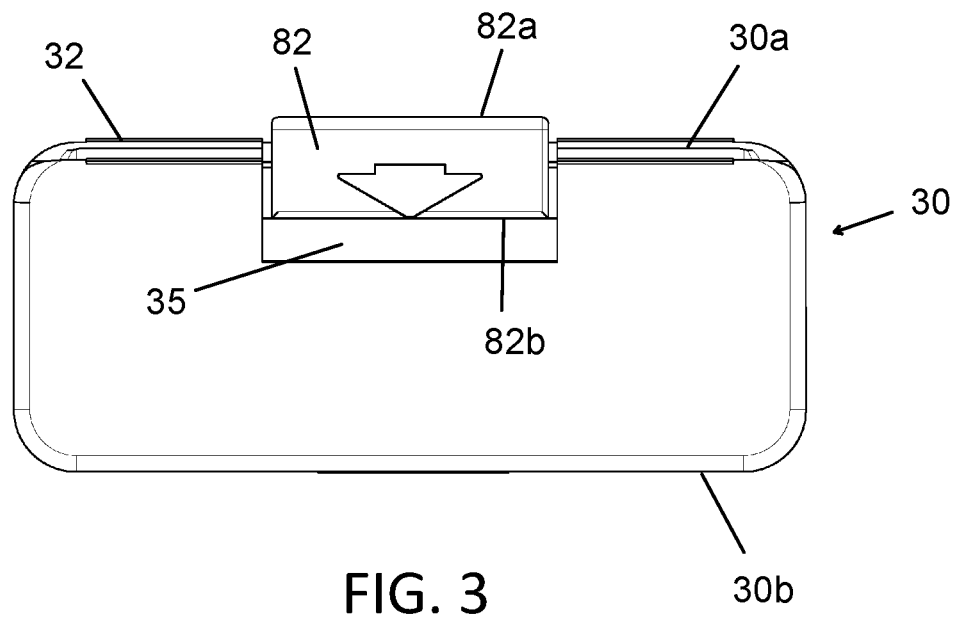
FIG. 3 is a top view of the safety container of FIG. 1.
Figure 4A:
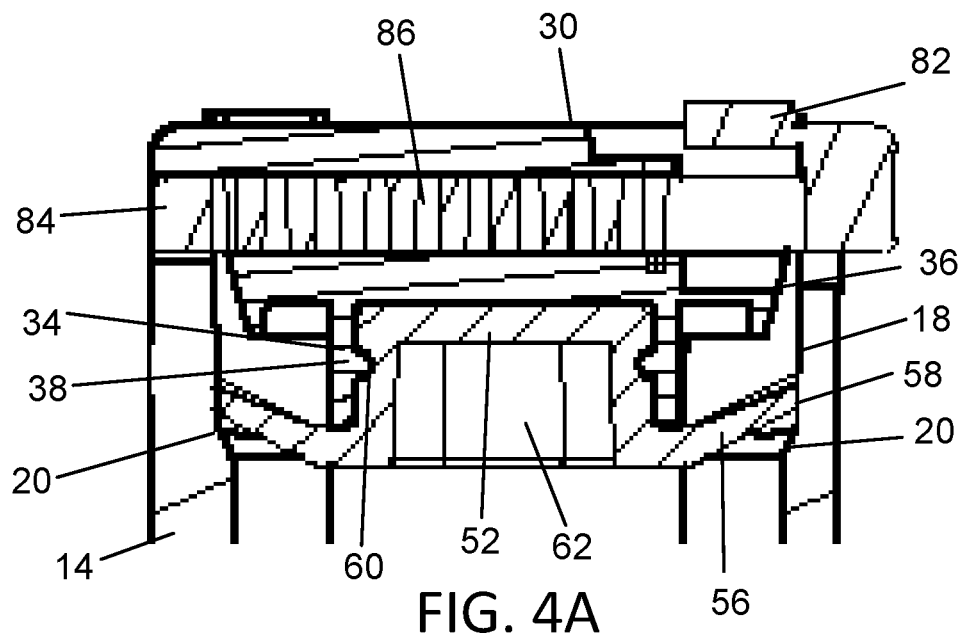
FIG. 4A is sectional view of the safety container of FIG. 1 in a locked position.
Figure 4B:
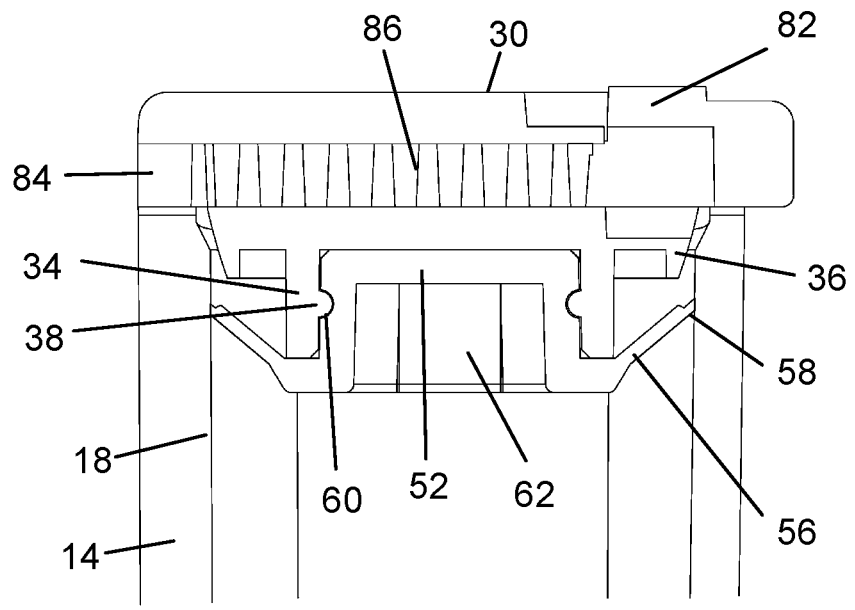
FIG. 4B is sectional view of an alternative embodiment of the safety container of FIG. 1 in a locked position.

Referring FIGS. 1-3, the container section 10 includes a container body 12 that is generally box-shaped with four generally rectangular sides 14, 16 extending from a generally rectangular floor or bottom side to form an enclosure with an open top. The container body 12 includes an inner surface 18 that defines a passage in the container body 12. In this embodiment, the inner surface 18 includes a tapered portion 20 which extends around the inner surface near the top of the container body 12, as shown in FIG. 4A. However, the inner surface 18 could be constructed without a tapered portion 20 as shown, for example, in FIG. 4B. A top portion of the container body 12 includes a lip portion 22 extending along a top edge of the container body 12. The lip portion 22 includes a lower locking member in the form of a void 24 which extends downwardly from the lip portion 22 to container body side 14 to form opposing locking necks 26, 28 on the container body front side 14, as shown in FIG. 2.

Referring to FIGS. 1-5, the cover section 30 is sized and shaped to conform with the lip portion 22 of the container body 12. In this embodiment, the cover section 30 is integral with the container section 10 and manufactured by injection molding as a single piece forming a hinge 32 between the container section 10 and the cover section 30. In this embodiment, the cover section 30 is sized and shaped substantially the same as an outermost edge of the container body 12, as shown in FIG. 1, such that when the safety container 1 is closed outer edges of the cover section 30 and the container section 10 are generally aligned. However, one of ordinary skill in the art would recognize that the cover section 30 could be sized and shaped different from the container section 10 without departing from the spirit and scope of the present invention. For example, portions of the cover section 30 could extend beyond the outermost edge of the container body 12.

Figure 5:
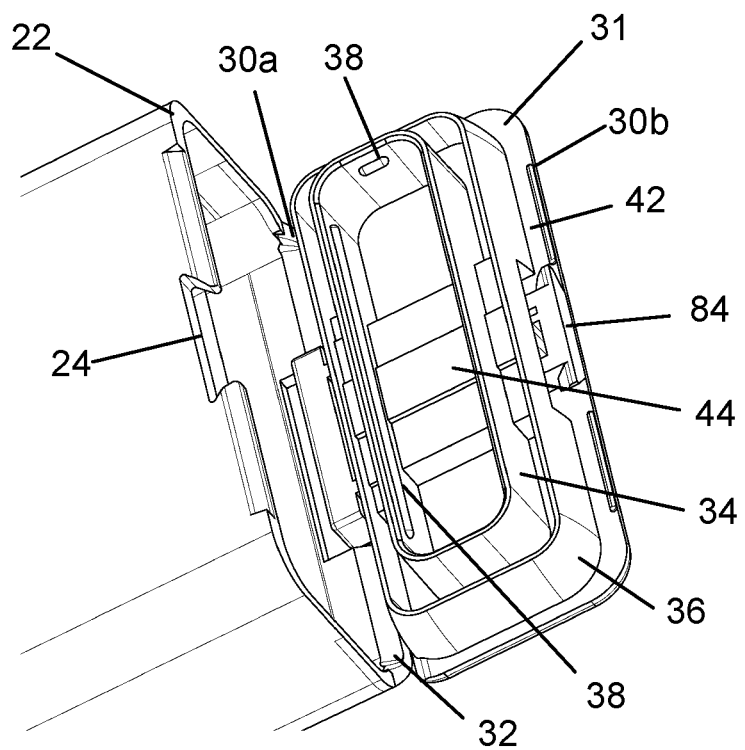
FIG. 5 is a bottom perspective view of the cover section of the safety container of FIG. 1.

As shown in FIG. 5, a bottom portion of the cover section 30 includes an inner wall or upper coupling member 34 and an outer wall 36 extending downwardly therefrom. The outer wall 36 is sized and shaped to fit within the inner surface 18 of the top portion of the container body 12 with minimal tolerance therebetween. The cover section 30 includes an upper lip 31 extending outwardly from the outer wall 36. A width of the upper lip 31 is substantially the same length as the thickness of the sides 14, 16 of the container body 10 such that when the container 1 is in a closed state, outer edges of the container body 10, i.e., the lip portion 31, and the outer edges of the cover section 30, i.e., the upper lip 31, are substantially aligned. In this embodiment, the downwardly extending length of the outer wall 36 is such that it does not extend below the tapered portion 20 of the inner surface 18 and such that the outer wall 36 does not interfere with the opening and closing of the cover section 30. The inner wall or upper coupling member 34 includes a plurality of detents 38, one on each side of the inner wall 34, extending transversely or inwardly toward a central portion of the cover section 30. In this embodiment, each detent 38 on the longer sides of the inner wall 34 extends along substantially the entire longer side and each detent 38 on the shorter sides of the inner wall 34 are substantially shorter than the transverse length of the shorter sides of the inner wall 34. However, one of ordinary skill in the art would recognize that the lengths of the detents 38 could vary.

Figure 5A:
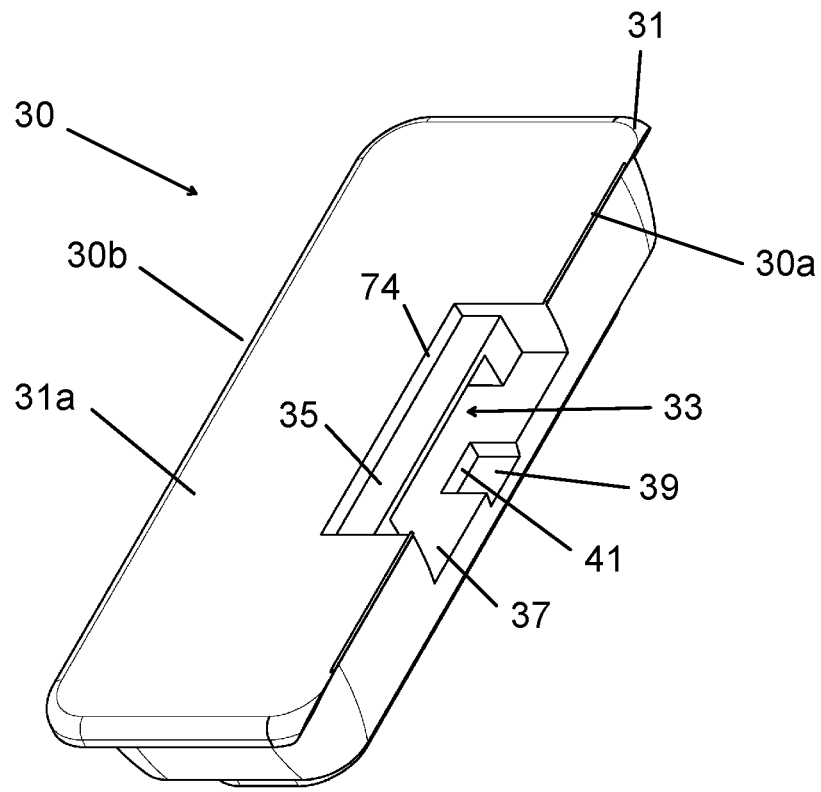
FIG. 5A is a top perspective view of the cover section of FIG. 5.
Figure 6:
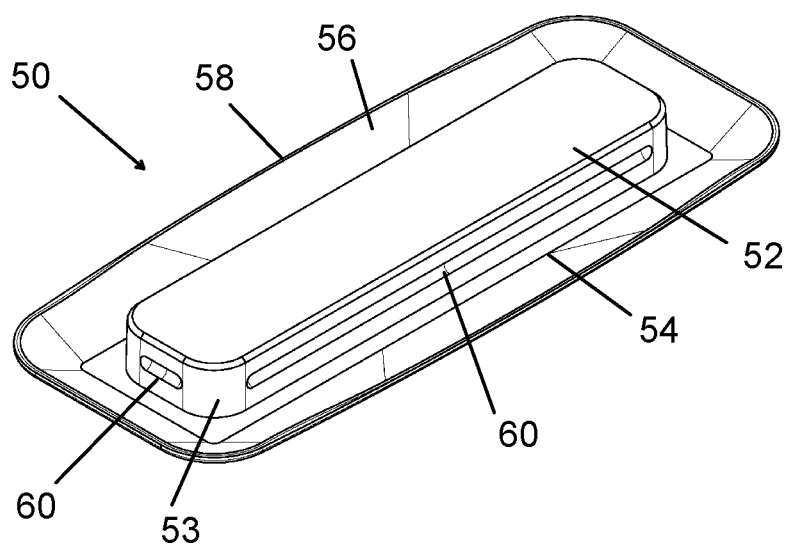
FIG. 6 is a top perspective view of the sealing member of the safety container of FIG. 1.

Referring to FIG. 5A, the cover section 30 includes an opening 33 leading to a pin channel 40 near the inner end 30a, which is described in detail below. The opening 33 is formed above an opening surface 37 and below a step 35 that is positioned slightly below an upper surface 31a of the cover section 30. An inner stop 74 is formed between the upper surface 31a of the cover section 30 and the step 35. The inner end 30a includes a slot 39, having a slot wall 41, formed on the opening surface 37 having a depth extending below the opening surface 37.

Figure 9:
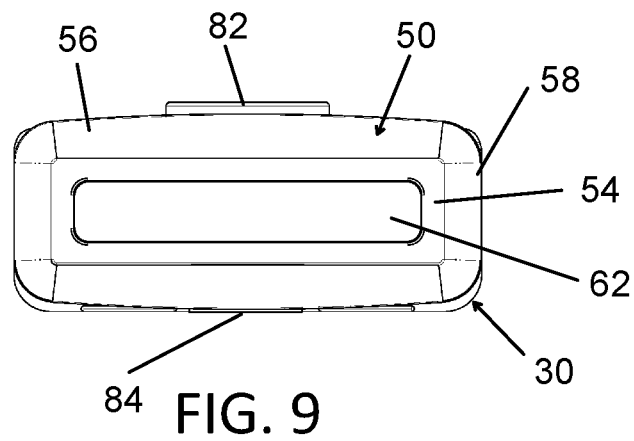
FIG. 9 is a bottom view of the sealing member of FIG. 6 coupled to the cover section of the safety container of FIG. 1.
Figure 10:
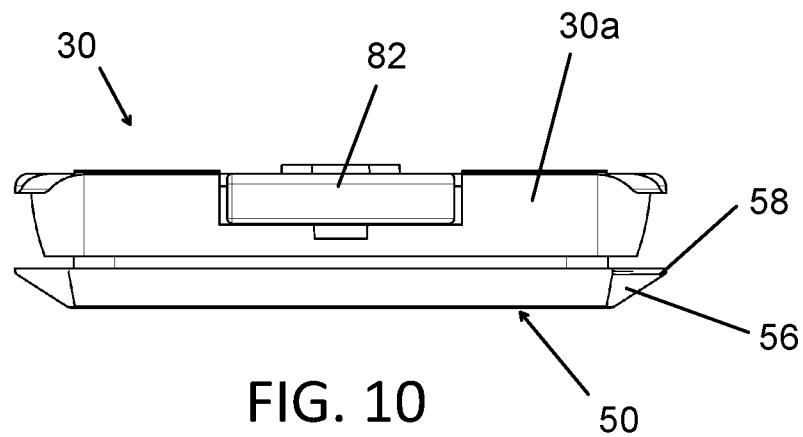
FIG. 10 is a rear view of FIG. 9.
Figure 11:
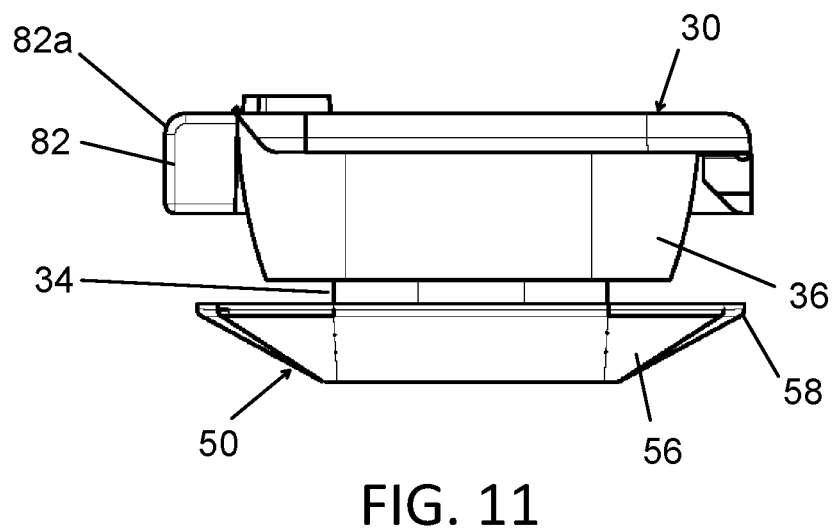
FIG. 11 is a left side view of FIG. 9.

As shown in FIGS. 6-11, the safety container 1 also includes a sealing member 50. In this embodiment, the sealing member 50 is substantially rectangular in overall shape conforming with the shape of the container and cover sections 10, 30. The sealing member 50 includes a central portion 52 having central walls 53 extending upwardly from a base portion 54. The base portion 54 includes an inclined outer extension 56 extending outwardly from the central portion 52, culminating at an outer edge 58. The sealing member 50 includes a plurality of grooves 60 positioned on the central walls 53, with the central portion 52 and grooves 60 forming a lower coupling member. In this embodiment, the grooves 60 are positioned on the central walls 53, however, the position of the grooves 60 could vary. For example, the grooves 60 could be positioned at or about the intersection of the central portion 52 and the base portion 54, i.e., on lower ends of all four sides of the central walls 53 of the central portion 52. The grooves 60 are positioned, sized and shaped such that corresponding detents 38 are secured therein. As such, the sealing member 50 and the cover section 30 are securely engaged, as shown in FIGS. 9-11. In the alternative, the sealing member 50 could be manufactured integral with the cover section 30, for example, by injection molding. In this embodiment, each groove 60 on the longer sides of the central/base portion 52, 54 extends along substantially the entire longer side and each central/base portion 52, 54, and the grooves 60 on the shorter sides of the central/base portion 52, 54 are substantially shorter than the transverse length of the shorter sides of the central/base portion 52, 54. However, one of ordinary skill in the art would recognize that the lengths of the grooves 60 could vary.

In this embodiment, the grooves 60 do not fully extend through the sealing member 50 so to eliminate the possibility of air or moisture entering the interior of the container body 12 when the container 1 is closed. However, in the alternative, if air or moisture prevention is not an issue, the grooves 60 could be manufactured to fully extend through the sealing member 50 to form a more secure and possibly permanent attachment of the sealing member 50 to the cover section 30 while further conserving manufacturing costs.

Figure 7:
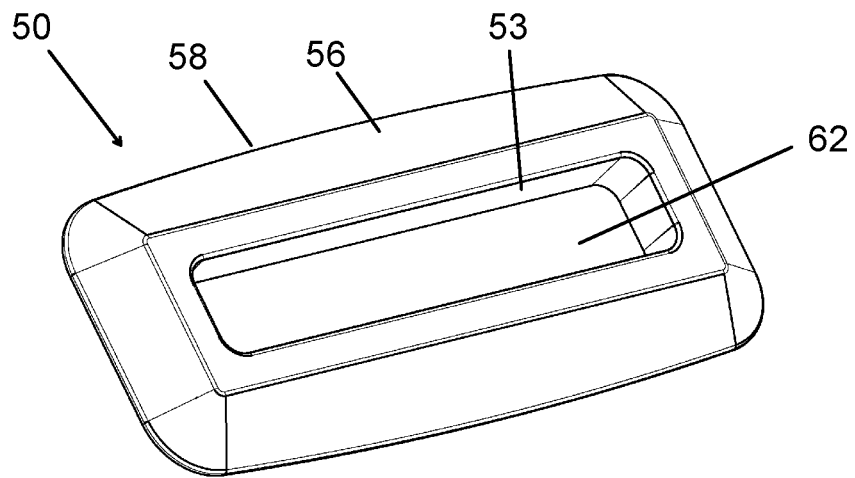
FIG. 7 is a bottom perspective view of the sealing member of FIG. 6.
Figure 8:
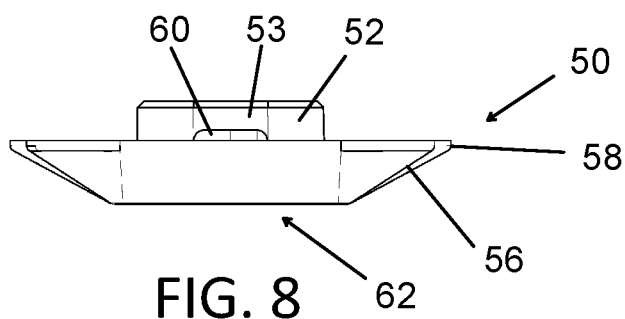
FIG. 8 is side view of the sealing member of FIG. 6.

As shown in FIG. 7, as a result of the upwardly extending central portion 52 on a top side of the sealing member 50, a channel 62 is formed on a bottom side of the sealing member 50 to save on cost of manufacture. However, one of ordinary skill in the art will recognize that the bottom side of the sealing member 50 could be manufactured without the channel 62.

Referring now to FIGS. 4A, 5, 12A and 12B, the bottom portion of the cover section 30 includes a pin channel 40 extending along inner and outer ends 30a, 30b of the cover section 30 between a bottom surface 42 of the cover section 30 and a guard rail 44 extending between opposing sides of the inner wall 34. In this embodiment, the guard rail 44 is one continuous surface without a space, however, in other embodiments, the guard rail 44 could include two spaced apart pieces with a space formed therebetween to conserve on manufacturing costs.

Figure 12A:
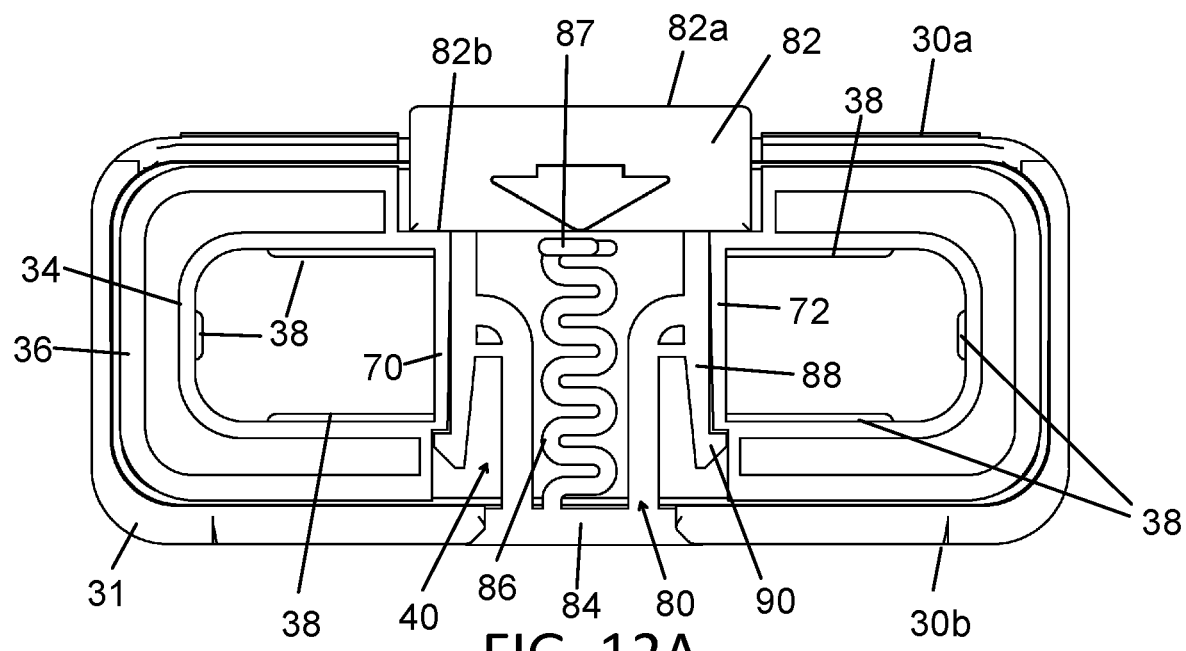
FIGS. 12A and 12B are top views of the locking pin of the safety container of FIG. 1 in a disengaged state and an engaged state, respectively, superimposed on a sectional view of the pin channel and cover section of the safety container of FIG. 1.
Figure 12B:
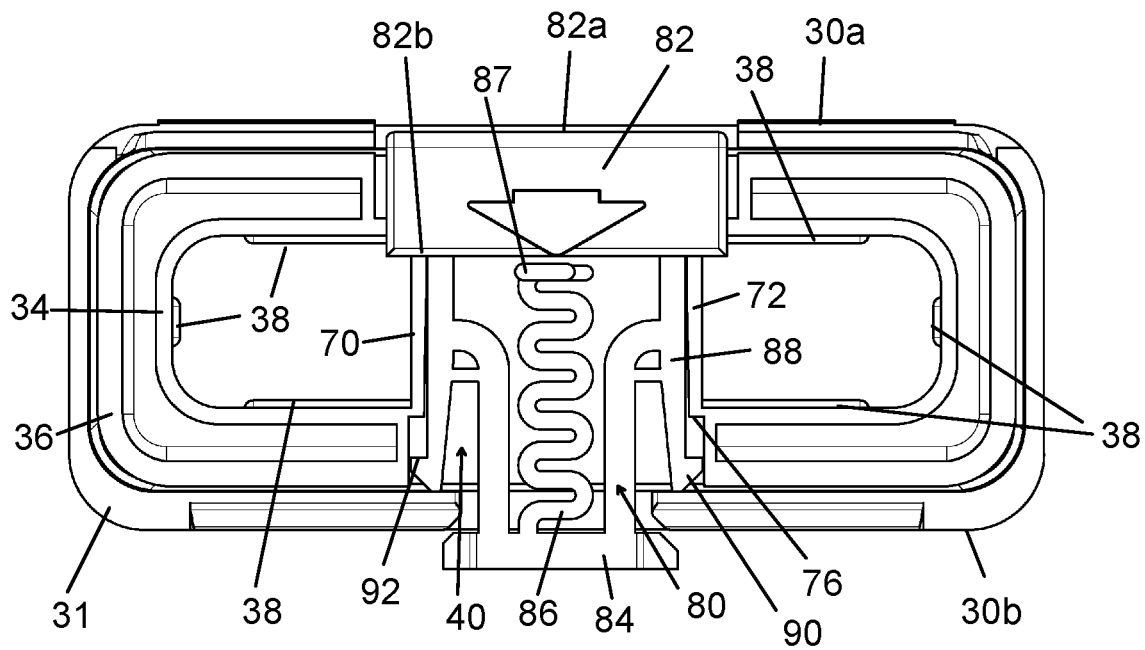
Figure 13:
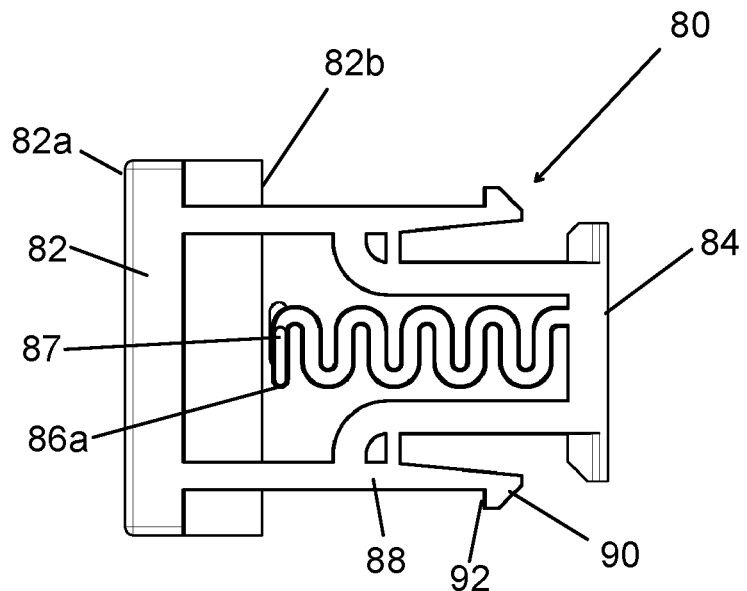
FIG. 13 is a bottom view of FIG. 12.

Referring to FIGS. 12A and 12B, the pin channel 40 includes a plurality of walls integrally formed between the guard rails 44 and the cover section bottom surface 42. Specifically, the pin channel 40 is formed with opposing guide walls 70, 72 that are of mirror image that extend between the inner and outer ends 30a, 30b of the cover section 30. Each guide wall 70, 72 includes an outer stop 76, surfaces of which are perpendicular to the pin channel 40.

Referring to FIGS. 12A-14, the safety container 1 also includes a locking pin 80 housed within the pin channel 40 and slidable therewithin. The locking pin 80 includes an engagement member 82, having first and second ends 82a, 82b, disposed on an inner end thereof, which normally, i.e., in a rested state, extends beyond the inner end 30a of the cover section 30. The engagement member 82 includes an upper section 83 which extends above an open space 85 corresponding to the step 35 on the cover section 30 shown in FIG. 5A. An upper locking member 84 is positioned on an outer end of the locking pin 80. In this embodiment, the upper locking member 84 is trapezoidal in shape, conforming in shape and size with the void 24. A biasing member 86 is positioned between the engagement member 82 and the upper locking member 84. The biasing member 86 includes a lower stop 87 extending downwardly from a free inner end 86a of the biasing member 86. A lower end 87a of the lower stop 87 is sized to correspond with and fit within the slot 39 of the cover section 30, i.e., the width of the lower stop 87 is substantially the same or slightly less than the width of the slot 39. The locking pin 80 further includes a pair of opposing guide rails 88, each with an engaging end 90 having an engaging surface 92. The guide rails 88 engage with and are slidable along a surface of the guide walls 70, 72 to ensure linear movement of the locking pin 80 when engaged. Each component of the locking pin 80 is integrally formed by injection molding with a durable plastic material.

FIGS. 12A and 12B show the locking pin 80 in a disengaged state and an engaged state, respectively, superimposed on a sectional view of the cover section 30, including the pin channel 40. As discussed above, in a rested or disengaged state, as shown in FIG. 12A, the engaging surfaces 92 of the locking pin 80 abut the outer stops 76 of the pin channel 40 while the lower stop lower end 87a abuts the slot wall 41. These opposing forces are offset by the compression force of the biasing member 86, resulting in the locking pin 80 remaining in a fixed position with the engagement member 82 extending beyond the inner end 30a of the cover section 30, as shown, for example, in FIGS. 3 and 11. Furthermore, the locking pin 80 is configured such that in the disengaged state, the upper locking member 84 and the lower locking member 24 are substantially aligned, whether the locking members 24, 84 are engaged or not.

When the engagement member 82 of the locking pin 80 is depressed as shown in FIG. 12B, the engaging surfaces 92 of the guide rails 88 and the outer stops 76 of the guide walls 70, 72 disengage, while the lower stop lower end 87a abuts the slot wall 41, causing the biasing member 86 to expand. As a result, the upper locking member 84 extends beyond outer end 30b of the cover section 30. However, the amount of extension of the locking member 84 is limited to the distance from the engagement member second end 82b in a disengaged state to the inner stop 74 as the engagement member 82 is limited to movement therebetween.

Referring to FIGS. 1, 4 and 12A, in operation, the safety container 1 is in a locked position when the cover section 30 is fully secured to the container section 10. In the locked position, the upper locking member 84 of the locking pin 80 is secured within the lower locking member or void 24 of the container body 12. Specifically, the outer edges of the trapezoidal upper locking member 84 engage the lower locking member 24 including the locking necks 26, 28, such that upward movement of the cover section 30 is restricted. As well, the outer edge 58 of the sealing member 50 engages the inner surface 18 of the container body 12. In this configuration, the safety container 1 is moisture-resistant as described above.

Referring to FIG. 12B, to open the safety container 1, a user first engages the engagement member first end 82a toward the front side 14 of the container body 12. With this motion, the upper locking member 84 is extended beyond the cover section outer end 30b and the container body front side 14, and released from the lower locking member 24. However, the cover section 30 remains secured to the container body 12 due to the sealing member 50 still being frictionally secured to the inner surface 18. Therefore, while the upper locking member 84 is extended beyond the cover section outer end 30b and released from the void 24, the user simultaneously engages the upper locking member 84 upward with sufficient force to release the sealing member 50 from the inner surface 18. As a result, the cover section 30 is removed from the container body 12 by rotating about the hinge 32, as shown in FIG. 2. As described above, the safety container 1 is rated as child-resistant at least due to the requirement for the user to perform two separate movements with sufficient force to open the safety container 1.

As described above, the container section 10, cover section 30, hinge 32 and pin channel 40 (including the components thereof) are collectively integrally formed by injection molding a durable plastic material such as polypropylene (PP). The locking pin 80 (including the components thereof) is also integrally formed by injection molding a durable plastic material such as polypropylene (PP). The sealing member 50 is formed by injection molding a durable but more flexible plastic such as polyethylene (PE). One of ordinary skill in the art would recognize, however, that other materials could be used to manufacture the components of the safety container 1, including other types of plastics, without departing from the spirit and scope of the present invention.

Upon completion of manufacture of the three sections of the safety container 1 as described above, the safety container 1 is assembled by inserting the locking pin 80 in the pin channel 40 through the opening 33. Specifically, referring to FIG. 12A, the guide rails 88 are deformed inwardly beyond respective guide walls 70, 72 and as the engaged ends 90 travel along respective guide walls 70 toward the outer end 30b of the cover section 30. The guide rails 88 expand when the engaged ends 90 move past the outer stops 76 causing the engaged ends 90 to expand outwardly. The engagement member upper section 83 is positioned above the step 35 while the lower stop 87 is positioned within the slot 39. As such, the locking pin 80 is secured within the pin channel 40 because the engaged ends 90 are restricted from moving toward the rear of the pin channel 40 beyond the outer stops 76.

The sealing member 50 is secured to the cover section 30 by inserting the central portion 52 within the inner wall 34. The grooves 60 of the sealing member 50 are engaged with the detents 38 of the inner wall 34 to form a secure engagement, as shown in FIGS. 9-11.

FIGS. 15-22B show another embodiment of the safety container 100 of the present invention. In general, the components of the safety container 100 are identical in form and function as the components of the safety container 1 described above. However, the safety container 100 is of a different shape, the inner surface of the container body does not include a tapered portion and the locking pin is configured to accommodate the increased depth of the cover section. For the sake of completeness, the safety container 100 is described in detail below while like components are referred to with identical descriptions as the safety container 1 described above and certain figures and descriptions for the same are incorporated by reference.

Figure 15:
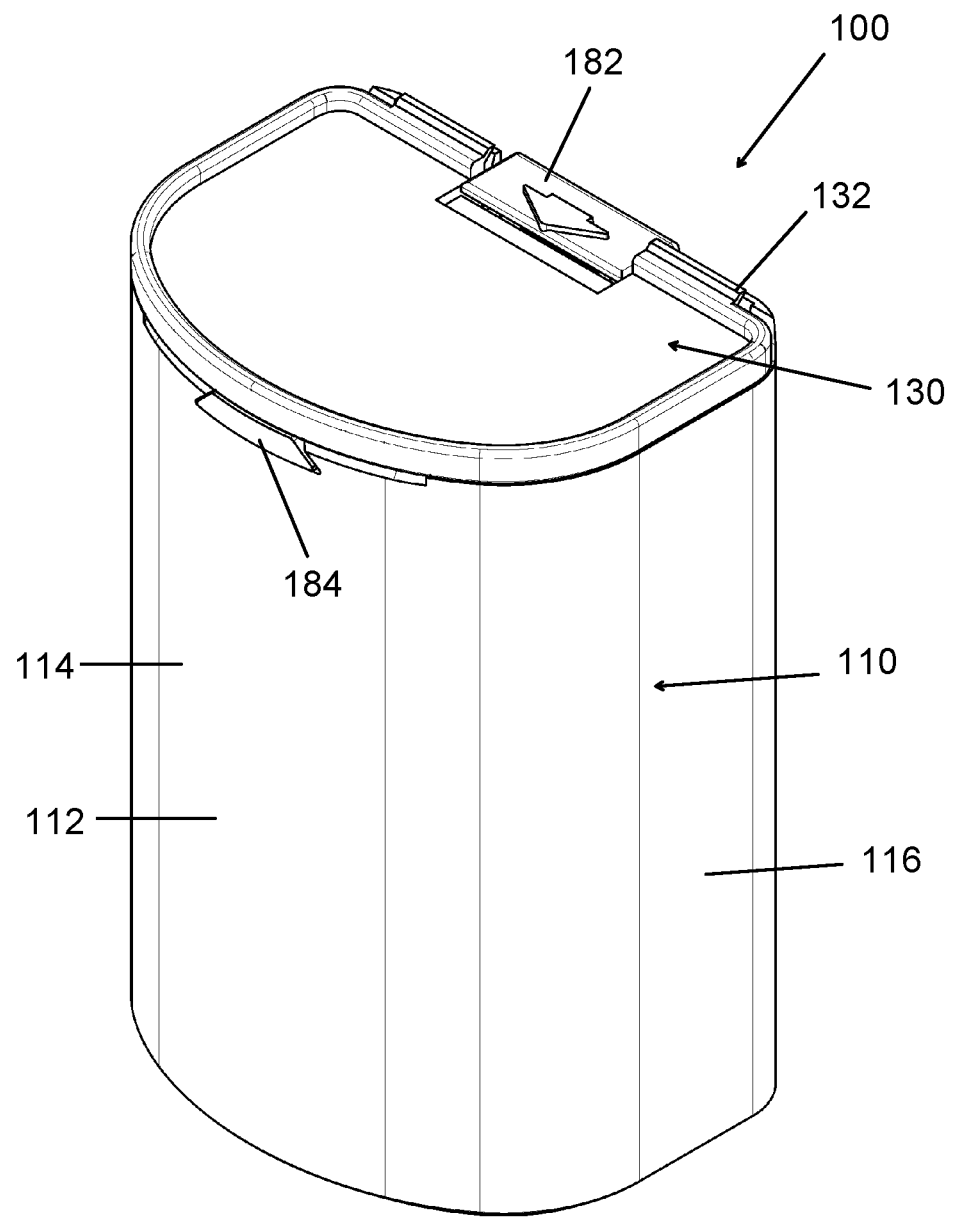
FIG. 15 is a top front side perspective view of another embodiment of the safety container of the present invention in a locked position.
Figure 16:
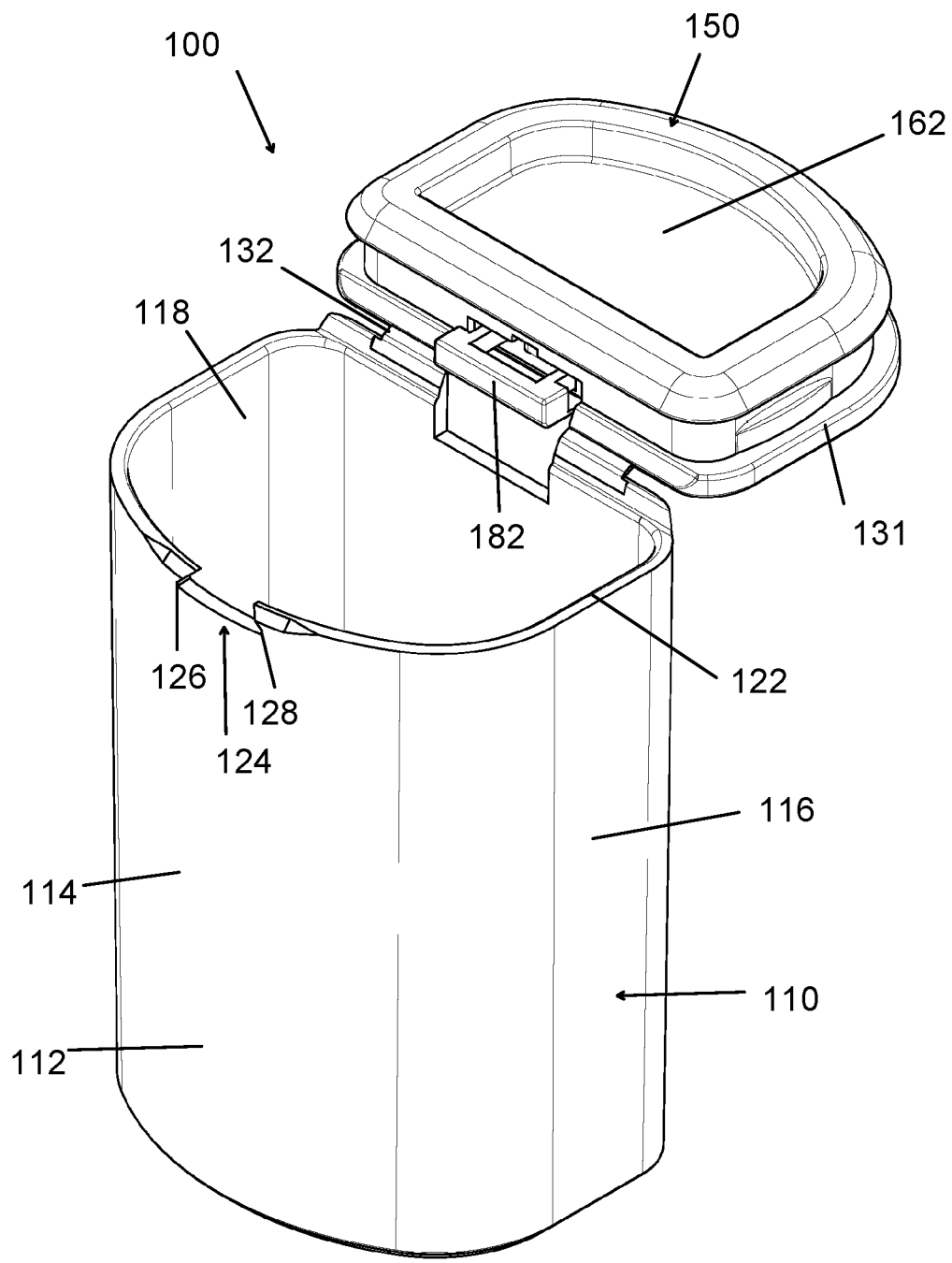
FIG. 16 is a top front side perspective view of the safety container of FIG. 15 in an open position.

FIGS. 15 and 16 show the safety container 100, which includes a container section 110 coupled with a cover section 130 hingedly or rotatably coupled thereto for safely opening and closing the cover section 130 to remove materials from or insert materials into the safety container 100 while meeting child-resistance certification requirements. Moreover, the safety container 100 is constructed to meet certification requirements for moisture resistance.

Still referring FIGS. 15 and 16, the container section 110 includes a container body 112 that is generally D-shaped with generally four sides 114, 116 extending from a generally D-shaped floor or bottom side (FIG. 19) to form an enclosure with an open top. The container body 112 includes an inner surface 118 that defines a passage in the container body 112. A top portion of the container body 112 includes a lip portion 122 extending along a top edge of the container body 112. The lip portion 122 includes a lower locking member in the form of a void 124 which extends downwardly from the lip portion 122 to container body side 114 to form opposing locking necks 126, 128 on the container body front side 114, as shown in FIG. 16.

Figure 17:
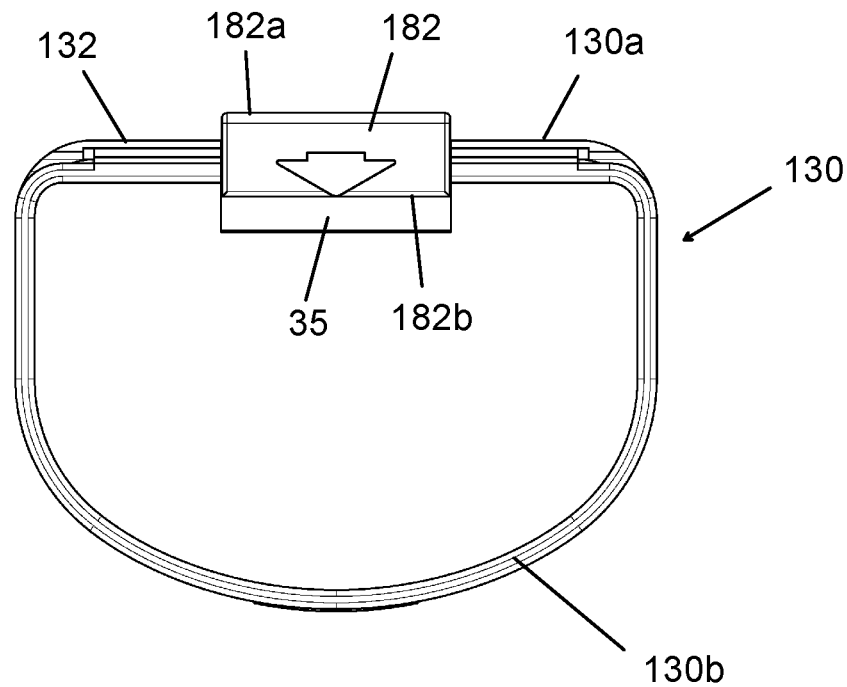
FIG. 17 is a top view of the safety container of FIG. 15.

Referring to FIGS. 15 and 17, the cover section 130 is sized and shaped to conform with the lip portion 122 of the container body 112. In this embodiment, the cover section 130 is integral with the container section 110 and manufactured by injection molding as a single piece forming a hinge 132 between the container section 110 and the cover section 130. In this embodiment, the cover section 130 is sized and shaped substantially the same as an outermost edge of the container body 112, as shown in FIG. 15, such that when the safety container 100 is closed outer edges of the cover section 130 and the container section 110 are generally aligned. However, one of ordinary skill in the art would recognize that the cover section 130 could be sized and shaped different from the container section 110 without departing from the spirit and scope of the present invention. For example, portions of the cover section 130 could extend beyond the outermost edge of the container body 112.

Figure 19:
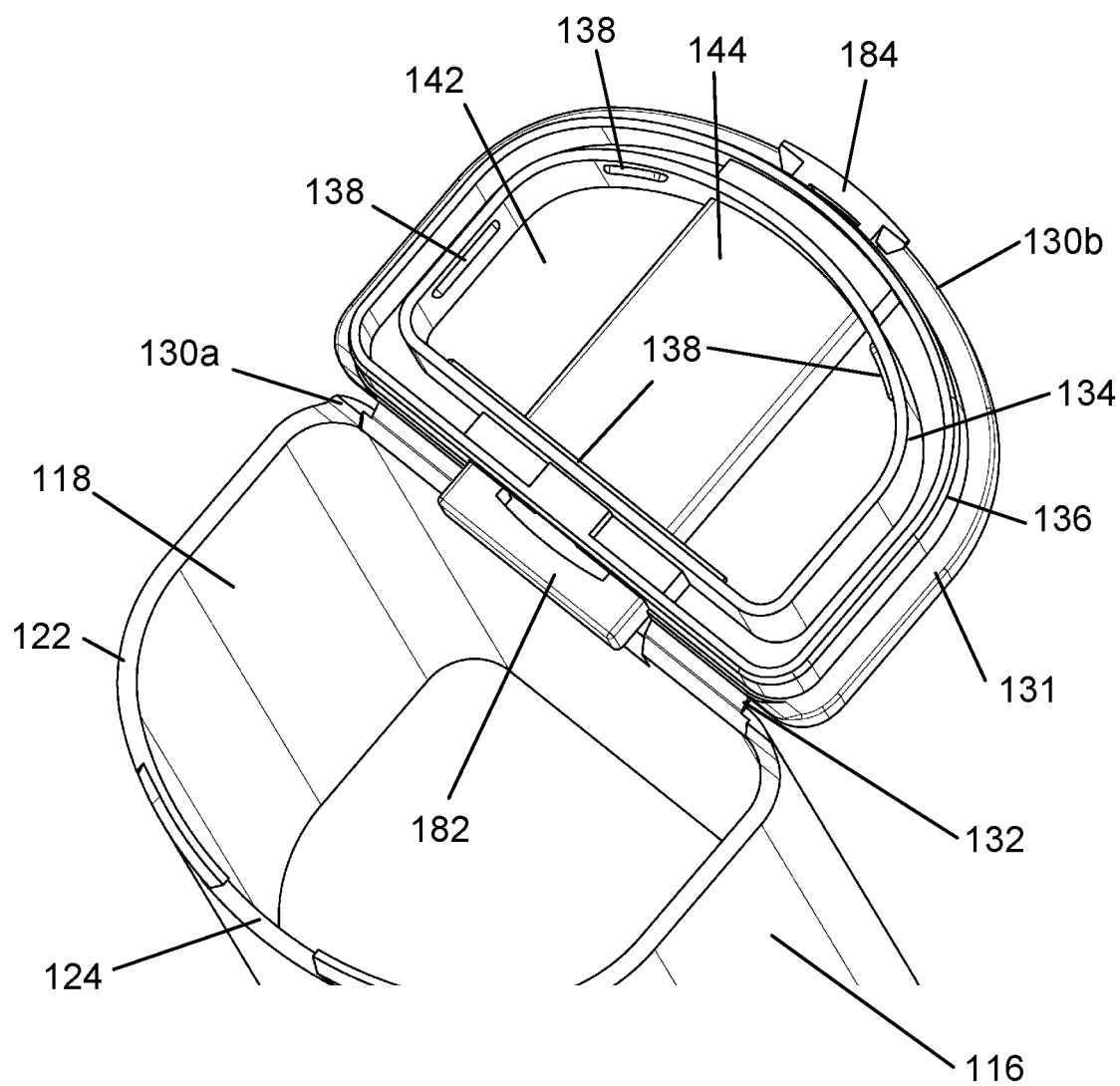
FIG. 19 is a bottom perspective view of the cover section of the safety container of FIG. 15.

As shown in FIG. 19, a bottom portion of the cover section 130 includes an inner wall or upper coupling member 134 and an outer wall 136 extending downwardly therefrom. The outer wall 36 is sized and shaped to fit within the inner surface 118 of the top portion of the container body 112 with minimal tolerance therebetween. The cover section 130 includes an upper lip 131 extending outwardly from the outer wall 136. A width of the upper lip 131 is substantially the same length as the thickness of the sides 114, 116 of the container body 110 such that when the container 100 is in a closed state, outer edges of the container body 110 and the cover section 130 are substantially aligned. In this embodiment, the downwardly extending length of the outer wall 136 is such that the outer wall 136 does not interfere with the opening and closing of the cover section 130. The inner wall or upper coupling member 134 includes a plurality of detents 138, with at least one on each side of the inner wall 134, extending transversely or inwardly toward a central portion of the cover section 130. In this embodiment, each detent 138 is spaced apart but could extend along substantially the entire length of each side of the inner wall 134. A such, one of ordinary skill in the art would recognize that the lengths of the detents 138 could vary.

A top portion of the cover section 130 is configured substantially the same as that shown in FIG. 5A and described above, except that the cover section is D-shaped. Therefore, FIG. 5A and the description for the same above is incorporated by reference.

Figure 18:
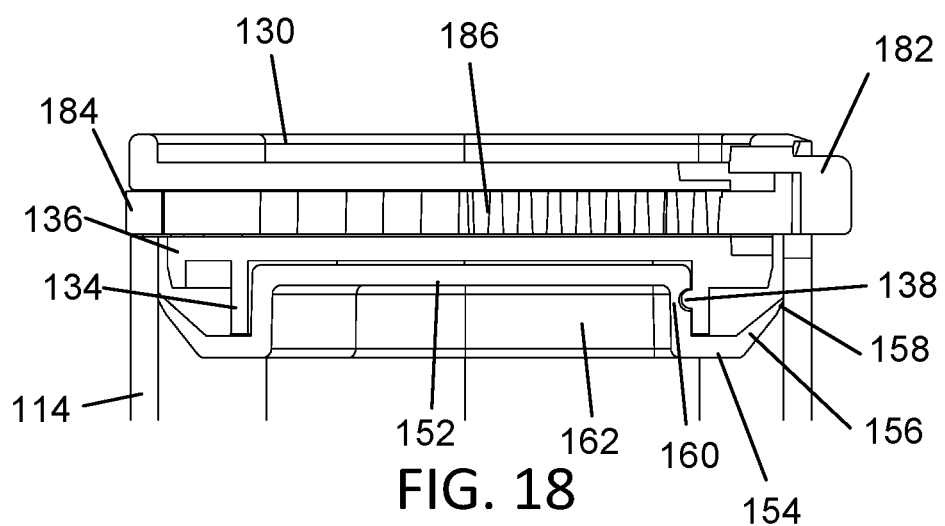
FIG. 18 is sectional view of the safety container of FIG. 15 in a locked position.
Figure 20:
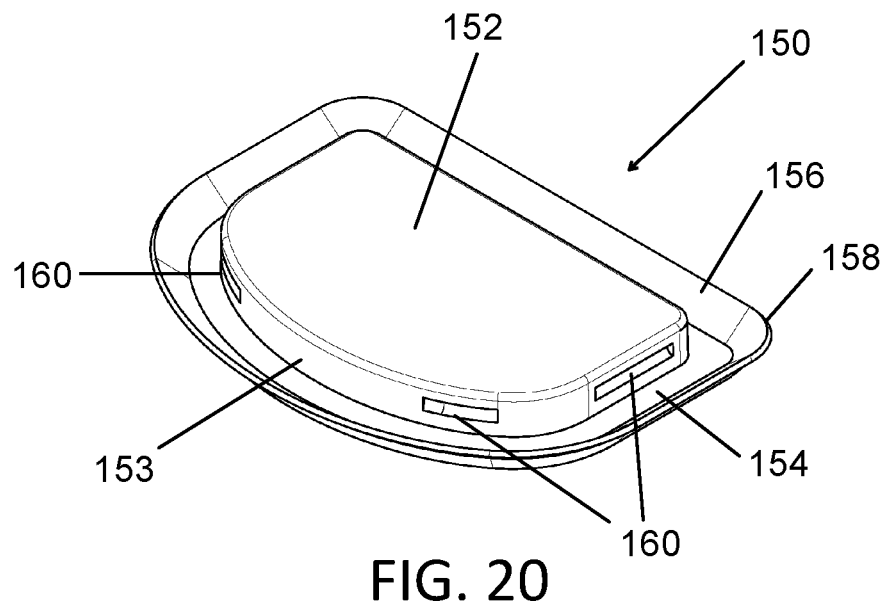
FIG. 20 is a top perspective view of the sealing member of the safety container of FIG. 15.
Figure 21:
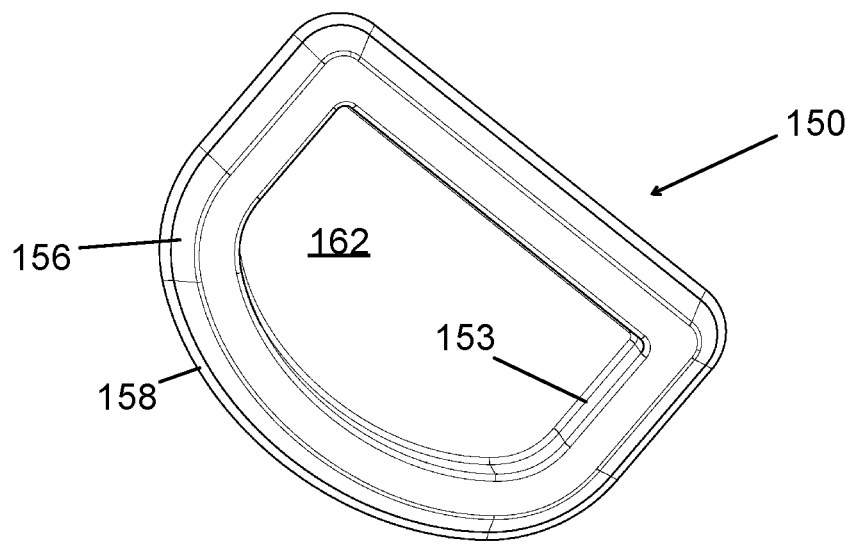
FIG. 21 is a bottom perspective view of the sealing member of FIG. 20.

As shown in FIGS. 20 and 21, the safety container 100 also includes a sealing member 150. In this embodiment, the sealing member 150 is substantially D-shaped conforming with the shape of the container and cover sections 110, 130. The sealing member 50 includes a central portion 152 having central walls 153 extending upwardly from a base portion 154. The base portion 154 includes an inclined outer extension 156 extending outwardly from the central portion 152, culminating at an outer edge 158. The sealing member 150 includes a plurality of grooves 160 positioned on the central walls 153, with the central portion 152 and grooves 160 forming a lower coupling member. In this embodiment, the grooves 160 are positioned on the central walls 153, however, the position of the grooves 160 could vary. For example, the grooves 160 could be positioned at or about the intersection of the central portion 152 and the base portion 154, i.e., on lower ends of all four sides of the central walls 153 of the central portion 152. The grooves 160 are positioned, sized and shaped such that corresponding detents 138 are secured therein. As such, the sealing member 150 and the cover section 130 are securely engaged, as shown in FIGS. 16 and 18. In the alternative, the sealing member 150 could be manufactured integral with the cover section 130, for example, by injection molding. In this embodiment, the grooves 160 are spaced apart from each other but they could also extend along substantially the entire length of each side of the central portion 152. As well, one of ordinary skill in the art would recognize that the lengths of the detents 138 could vary to accommodate the length of the grooves.

In this embodiment, the grooves 160 do not fully extend through the sealing member 150 to eliminate the possibility of air or moisture entering the interior of the container body 112 when the container 100 is closed. However, in the alternative, if air or moisture prevention is not an issue, the grooves 160 could be manufactured to fully extend through the sealing member 150 to form a more secure and possibly permanent attachment of the sealing member 150 to the cover section 130 while further conserving manufacturing costs.

As shown in FIG. 21, as a result of the upwardly extending central portion 152 on a top side of the sealing member 150, a channel 162 is formed on a bottom side of the sealing member 150 to save on cost of manufacture. However, one of ordinary skill in the art will recognize that the bottom side of the sealing member 150 could be manufactured without the channel 162.

Figure 22A:
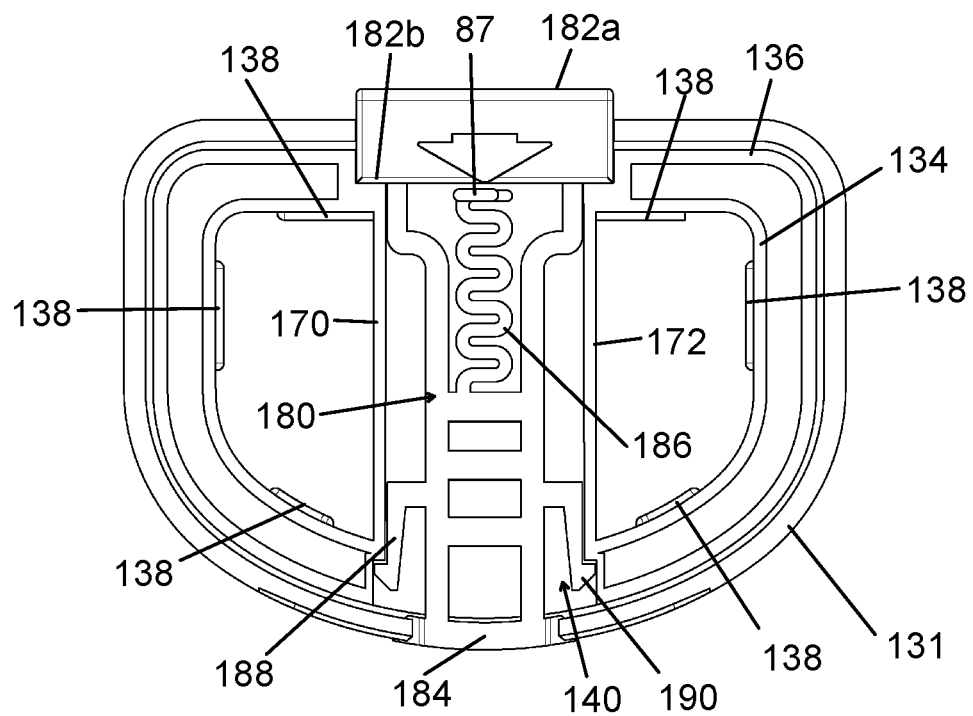
FIGS. 22A and 22B are a top views of the locking pin of the safety container of FIG. 15 in a disengaged state and an engaged state, respectively, superimposed on a sectional view of the pin channel and the cover section of the safety container of FIG. 15.
Figure 22B:
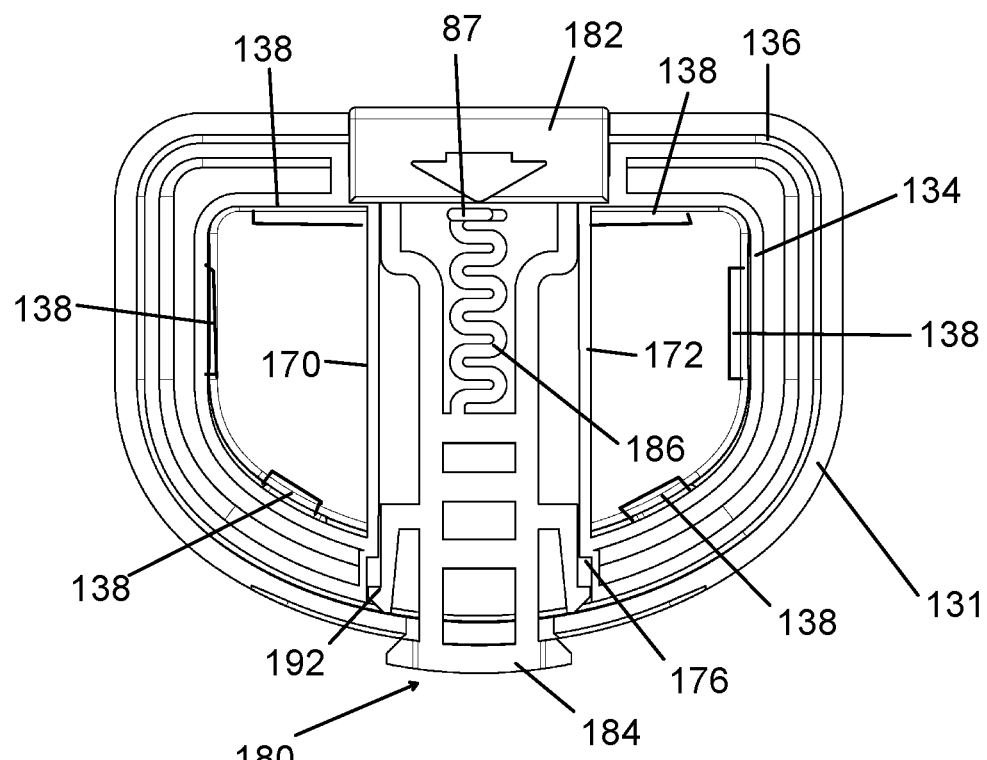

Referring now to FIGS. 19, 22A and 22B, the bottom portion of the cover section 130 includes a pin channel 140 extending along inner and outer ends 130a, 130b of the cover section 130 between a bottom surface 142 of the cover section 130 and a guard rail 144 extending between opposing sides of the inner wall 134. In this embodiment, the guard rail 144 is one continuous surface without a space, however, in other embodiments, the guard rail 144 could include two spaced apart pieces with a space is formed therebetween to conserve on manufacturing costs.

Referring to FIGS. 22A and 22B, the pin channel 140 includes a plurality of walls integrally formed between the guard rails 144 and the cover section bottom surface 142. Specifically, the pin channel 140 is formed with opposing guide walls 170, 172 that are of mirror image that extend between the inner and outer ends 130a, 130b of the cover section 130. Each guide wall 170, 172 includes an outer stop 176, surfaces of which are perpendicular to the pin channel 140.

Figure 14:
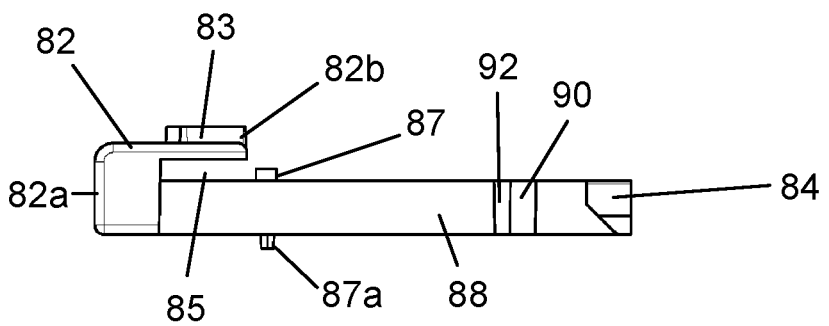
FIG. 14 is a side view of FIG. 12.

Still referring to FIGS. 22A and 22B, the safety container 100 also includes a locking pin 180 housed within the pin channel 140 and slidable therewithin. The locking pin 180 includes an engagement member 182, having first and second ends 182a, 182b, disposed on an inner end thereof, which normally, i.e., in a rested state, extends beyond the inner end 130a of the cover section 130. The locking pin 180 is substantially similar to the locking pin 80 shown in FIGS. 13 and 14 and described above and therefore, the disclosure of the same is incorporated by reference. As shown in FIG. 14, the engagement member 182 includes an upper section 83 which extends above an open space 85 corresponding to the step 35 on the cover section 130 shown in FIG. 5A. An upper locking member 184 is positioned on an outer end of the locking pin 180. In this embodiment, the upper locking member 184 is trapezoidal in shape, conforming in shape and size with the void 124. A biasing member 186 is positioned between the engagement member 182 and the upper locking member 184. As shown in FIG. 14, the biasing member 186 includes a lower stop 87 extending downwardly from a free inner end 86a of the biasing member 186. A lower end 87a of the lower stop 87 is sized to correspond with and fit within the slot 39 of the cover section 130. The locking pin 180 further includes a pair of opposing guide rails 188, each with an engaging end 190 having an engaging surface 192. The guide rails 188 engage with and are slidable along a surface of the guide walls 170, 172 to ensure linear movement of the locking pin 180 when engaged. Each component of the locking pin 180 is integrally formed by injection molding with a durable plastic material.

FIGS. 22A and 22B show the locking pin 180 in a disengaged state and an engaged state, respectively, superimposed on a sectional view of cover section 130, including the pin channel 140. As discussed above, in a rested or disengaged state, as shown in FIG. 22A, the engaging surfaces 192 of the locking pin 180 abut the outer stops 176 of the guide walls 170, 172 while the lower stop lower end 87a (FIG. 14) abuts the slot wall 41 (FIG. 5A). These opposing forces are offset by the compression force of the biasing member 186, resulting in the locking pin 180 remaining in a fixed position with the engagement member 182 extending beyond the inner end 130a of the cover section 130, as shown, for example, in FIGS. 15-18. Furthermore, the locking pin 180 is configured such that in the disengaged state, the upper locking member 184 and the lower locking member 124 are substantially aligned, whether the locking members 124, 184 are engaged or not.

When the engagement member 182 of the locking pin 180 is depressed as shown in FIG. 22B, the engaging surfaces 192 of the guide rails 188 and the outer stops 176 of the guide walls 170, 172 disengage, while the lower stop lower end 87a abuts the slot wall 41, causing the biasing member 186 to expand. As a result, the upper locking member 184 extends beyond outer end 130b of the cover section 130 and void 124. However, the amount of extension of the locking member 184 is limited to the distance from the engagement member second end 182b in a disengaged state to the inner stop 74 (FIG. 5A) as the engagement member 182 is limited to movement therebetween.

Referring to FIGS. 15,18 and 22A, in operation, the safety container 100 is in a locked position when the cover section 130 is fully secured to the container section 110. In the locked position, the upper locking member 184 of the locking pin 180 is secured within the lower locking member or void 124 of the container body 112. Specifically, the outer edges of the trapezoidal upper locking member 184 engage the lower locking member 124 including the locking necks 126, 128, such that upward movement of the cover section 130 is restricted. As well, the outer edge 158 of the sealing member 150 engages the inner surface 118 of the container body 112. In this configuration, the safety container 100 is moisture-resistant as described above.

Referring to FIG. 22B, to open the safety container 100, a user first engages the engagement member first end 182a toward the front side 114 of the container body 112. With this motion, the upper locking member 184 is extended beyond the cover section outer end 130b and the container body front side 114, and released from the lower locking member 124. However, the cover section 130 remains secured to the container body 112 due to the sealing member 150 still being frictionally secured to the inner surface 118. Therefore, while the upper locking member 184 is extended beyond the cover section outer end 130b, the user simultaneously engages the upper locking member 184 upward with sufficient force to release the sealing member 150 from the inner surface 118. As a result, the cover section 130 is removed from the container body 112 by rotating about the hinge 132, as shown in FIG. 16. As described above, the safety container 100 is rated as child-resistant due to the requirement for the user to perform two separate movements with sufficient force to open the safety container 100.

As described above, the container section 110, cover section 130, hinge 132 and pin channel 140 (including the components thereof) are collectively integrally formed by injection molding a durable plastic material such as polypropylene (PP). The locking pin 180 (including the components thereof) are also integrally formed by injection molding a durable plastic material such as polypropylene (PP). The sealing member 150 is formed by injection molding a durable but more flexible plastic such as polyethylene (PE). One of ordinary skill in the art would recognize, however, that other materials could be used to manufacture the components of the safety container 100, including other types of plastics, without departing from the spirit and scope of the present invention.

Upon completion of manufacture of the three sections of the safety container 100 as described above, the safety container 100 is assembled by inserting the locking pin 180 in the pin channel 140 through the opening 33 shown in FIG. 5A. Specifically, referring to FIG. 22A, the guide rails 188 are deformed inwardly beyond respective guide walls 170, 172 and as the engaged ends 190 travel along respective guide walls 170, 172 toward the outer end 130b of the cover section 130. The guide rails 188 expand when the engaged ends 190 move past the outer stops 176 causing the engaged ends 190 to expand outwardly. The engagement member upper section 183 is positioned above the step 35 while the lower stop 87 is positioned within the slot 39 (FIGS. 5A and 14). As such, the locking pin 180 is secured within the pin channel 140 because the engaged ends 190 are restricted from moving toward the rear of the pin channel 140 beyond the outer stops 176.

The sealing member 150 is secured to the cover section 130 by inserting the central portion 152 within the inner wall 134. The grooves 160 of the sealing member 150 are engaged with the detents 138 of the inner wall 134 to form a secure engagement, as shown in FIG. 16.

With respect to the grooves 60, 160 of the sealing member 50, 150 and the detents 38, 138 of the cover section inner wall 34, 134, other variations could be implemented without departing from the spirit and scope of the invention. That is, the grooves and detents could be positioned higher or lower than shown and with different lengths, widths and depths. For example, the grooves could extend completely around the sealing member central portion 52, 152 while the grooves could extend completely around the inner wall 34, 134. As another example, the grooves could be apertures that extend completely through the sealing member central portion 52, 152. The sealing member 50, 150 and the cover section 30, 130 could also be coupled with other methods. For example, an adhesive could be applied therebetween to form a permanently coupling.

The present invention may be embodied in other specific forms without departing from its spirit or essential characteristics. The described embodiments are to be considered in all respects only as illustrative and not restrictive. The scope of the invention, therefore, will be indicated by claims rather than by the foregoing description. All changes, which come within the meaning and range of equivalency of the claims, are to be embraced within their scope.

What is claimed is:

1. A safety container, comprising, in combination:
   a container section having a container body and a lip portion surrounding a passage in the body, the passage in the container body defined by an inner surface, the lip portion having an inner end and an opposing outer end, the lip portion outer end comprising a lower locking member;
   a cover section conforming to at least a part of the lip portion, the cover section having an inner end and an opposing outer end, the cover section inner end hingedly coupled with the lip portion inner end, the cover section comprising:
      a pin channel formed on a bottom surface of the cover section, the pin channel extending along the cover section inner and outer ends, and
      an upper coupling member extending downwardly from the bottom surface;
   a sealing member, the sealing member having a lower coupling member extending upwardly therefrom and conforming to the upper coupling member and secured thereto, and an outer edge conforming to the inner surface of the container body; and
   a locking pin slidably mounted in the pin channel, the locking pin having an inner end and an opposing outer end, the locking pin comprising:
      an engagement member on the locking pin inner end,
      an upper locking member on the locking pin outer end conforming to the lower locking member, and
      a biasing member coupled therebetween;
   wherein in a locked position, the upper and lower locking members lockingly engage each other and the sealing member outer edge engages the container body inner surface to seal the passage of the container body; and
   wherein the cover section is at least partially removed from the container section to an open position when the locking pin engagement member is depressed toward the cover section outer end thereby releasing the upper and lower locking members, and the upper locking member is engaged upwardly.

2. The safety container of claim 1, wherein in the locked position the sealing member outer edge and the container body inner surface are frictionally engaged to form a complete moisture-tight seal within the container body.

3. The safety container of claim 2, wherein the container body inner surface comprises a tapered portion, wherein the sealing member outer edge engages the container body inner surface at or about the tapered portion.

4. The safety container of claim 1, wherein the lower locking member is a void and the upper locking member is an extension conforming to the void.

5. The safety container of claim 1, wherein the cover section upper coupling member comprises a detent and the sealing member lower coupling member comprises a groove, such that the detent and groove are engaged to secure the upper and lower coupling members together.

6. The safety container of claim 1, wherein the cover section inner end and the lip portion inner end are coupled together by injection molding.

7. A safety container, comprising, in combination:
   a container section having a container body and a lip portion surrounding a passage in the body, the passage in the container body defined by an inner surface, the lip portion having an inner end and an opposing outer end, the lip portion outer end comprising a lower locking member;
   a cover section conforming to at least a part of the lip portion, the cover section having an inner end and an opposing outer end, the cover section at least partially removably coupled with the lip portion, the cover section comprising:
      a pin channel formed on a bottom surface of the cover section, the pin channel extending along the cover section inner and outer ends, and
      an upper coupling member extending downwardly from the bottom surface;
   a sealing member, the sealing member having a lower coupling member extending upwardly therefrom and conforming to the upper coupling member and secured thereto, and an outer edge conforming to the inner surface of the container body; and
   a locking pin slidably mounted in the pin channel, the locking pin having an inner end and an opposing outer end, the locking pin comprising an upper locking member on the locking pin outer end conforming to the lower locking member;
   wherein in a locked position, the upper and lower locking members lockingly engage each other and the sealing member outer edge engages the body inner surface to seal the passage of the container body; and
   wherein the upper and lower locking members are disengaged, and the upper locking member is engaged upwardly to at least partially remove the cover section from the container section to an open position.

8. The safety container of claim 7, wherein in the locked position the sealing member outer edge and the container body inner surface are frictionally engaged to form a complete moisture-tight seal within the container body.

9. The safety container of claim 8, wherein the container body inner surface comprises a tapered portion, wherein the sealing member outer edge engages the container body inner surface at or about the tapered portion.

10. The safety container of claim 9, wherein the lower locking member is a void and the upper locking member is an extension conforming to the void.

11. The safety container of claim 7, wherein the cover section upper coupling member comprises a detent and the sealing member lower coupling member comprises a groove, such that the detent and groove are engaged to secure the upper and lower coupling members together.

12. The safety container of claim 7, wherein the cover section inner end and the lip portion inner end are rotatably coupled by injection molding.

13. A safety container, comprising, in combination:
   a container section having a container body and a lip portion surrounding a passage in the body, the passage in the container body defined by an inner surface, the lip portion having an inner end and an opposing outer end;
   a cover section conforming to at least a part of the lip portion and at least partially removably coupled thereto, the cover section having an inner end and an opposing outer end;
   a sealing member coupled to a bottom portion of the cover section; and
   a locking pin slidably mounted to the bottom portion of the cover section and engageable with the container section, the locking pin having an inner end and an outer end;

wherein in a locked position, the container section and the cover section lockingly engage each other by the locking pin outer end engaging the lip portion outer end, and the sealing member engaging the container body inner surface to seal the passage of the container body; and wherein in an open position, the locking pin is disengaged from the lip portion and the locking pin is further engaged upward to at least partially remove the cover section from the container section.

14. The safety container of claim 13, wherein:

the cover section comprises an upper coupling member extending downwardly from the bottom surface; and the sealing member comprises a lower coupling member extending upwardly therefrom;

wherein the upper and lower coupling members are coupled secured together.

15. The safety container of claim 14, wherein the cover section upper coupling member comprises a detent and the sealing member lower coupling member comprises a groove, such that the detent and groove are engaged to secure the upper and lower coupling members together.

16. The safety container of claim 14, wherein the sealing member comprises an outer edge conforming to the inner surface of the container body such that in the locked position the sealing member outer edge and the container body inner surface are frictionally engaged to form a complete moisture-tight seal within the container body.

17. The safety container of claim 16, wherein the container body inner surface comprises a tapered portion, wherein the sealing member outer edge engages the container body inner surface at or about the tapered portion.

18. The safety container of claim 13, wherein the lip portion outer end comprises a lower locking member and the locking pin outer end comprises an upper locking member conforming to the lower locking member.

19. The safety container of claim 18, wherein the lower locking member is a void and the upper locking member is an extension conforming to the void.

20. The safety container of claim 13, wherein the cover section comprises a pin channel formed on a bottom surface of the cover section, the pin channel extending along the cover section inner and outer ends;

wherein the locking pin is housed within the pin channel.

\* \* \* \* \*